US009372316B2

(12) United States Patent
Jou et al.

(10) Patent No.: US 9,372,316 B2
(45) Date of Patent: Jun. 21, 2016

(54) SILICON INTERFACE FOR DIELECTRIC SLAB WAVEGUIDE (71) Applicant: Taiwan Semiconductor Manufacturing Co., Ltd., Hsin-Chu (TW)

(72) Inventors: Chewn-Pu Jou, Hsinchu (TW); Tien-I Bao, Dayuan Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/483,247

(22) Filed: Sep. 11, 2014

(65) Prior Publication Data

US 2016/0077294 A1 Mar. 17, 2016

(51) Int. Cl.
*G02B 6/12* (2006.01)
*G02B 6/42* (2006.01)
*G02B 6/132* (2006.01)
*G02B 6/122* (2006.01)

(52) U.S. Cl.
CPC .............. *G02B 6/4298* (2013.01); *G02B 6/122* (2013.01); *G02B 6/132* (2013.01); *G02B 6/4274* (2013.01)

(58) Field of Classification Search
CPC ........... G02B 6/42; G02B 6/122; G02B 6/132
USPC ........................ 385/14, 88; 438/24; 257/432
See application file for complete search history.

(56) References Cited

U.S. PATENT DOCUMENTS

| 8,669,834 | B2 | 3/2014 | Cheng et al. |
| 2008/0012663 | A1 | 1/2008 | Chung et al. |
| 2012/0280345 | A1* | 11/2012 | Zhu ................ G02B 6/1226 257/432 |
| 2013/0154759 | A1* | 6/2013 | Morita ............... H01P 3/081 333/26 |
| 2015/0214122 | A1* | 7/2015 | Vermeulen ......... G01M 11/30 438/14 |

OTHER PUBLICATIONS

U.S. Appl. No. 14/692,794, filed Apr. 22, 2015.
Bozzi, M., et al., "Review of substrate-integrated waveguide circuits and antennas," Microwaves, Antennas & Propagation, IET, vol. 5, No. 8, p. 909-920, Jun. 6, 2011.

* cited by examiner

*Primary Examiner* — Ellen Kim
(74) *Attorney, Agent, or Firm* — Eschweiler & Associates, LLC (57) ABSTRACT The present disclosure relates to an integrated chip having coupling elements that couple electromagnetic radiation having a frequency outside of the visible spectrum between a silicon substrate and a dielectric waveguide overlying the silicon substrate. In some embodiments, the integrated chip has a dielectric waveguide disposed within an inter-level dielectric (ILD) material overlying a semiconductor substrate. A first coupling element couples a first electrical signal generated by a driver circuit disposed within the semiconductor substrate to a first end of the dielectric waveguide as electromagnetic radiation having a frequency outside of the visible spectrum. A second coupling element couples the electromagnetic radiation from a second end of the dielectric waveguide to a second electrical signal. By coupling electromagnetic radiation having a frequency outside of the visible spectrum to and from the dielectric waveguide, the disclosed integrated chip is able to overcome a number of drawbacks of optical integrated waveguides.

20 Claims, 9 Drawing Sheets

Fig. 13

SILICON INTERFACE FOR DIELECTRIC SLAB WAVEGUIDE

BACKGROUND

Integrated optical waveguides are often used as components in integrated optical circuits, which integrate multiple photonic functions. Integrated optical waveguides are used to confine and guide light from a first point on an integrated chip (IC) to a second point on the IC with minimal attenuation. Generally, integrated optical waveguides provide functionality for signals imposed on optical wavelengths in the visible spectrum (e.g., between approximately 850 nm and approximately 1650 nm).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated optical waveguides are often used in integrated optical circuits. Generally, an integrated optical waveguide consist of an optical medium having a high dielectric constant (i.e., a core), which is surrounded by a medium having a lower dielectric constant. Visible light that is injected into an end of the integrated optical waveguide (e.g., using a lens, a grating coupler or prism coupler) is guided along a length of the waveguide by way of total internal reflection due to the difference in dielectric constants between the core and the surrounding medium.

Because integrated optical waveguides are limited to transmitting electromagnetic radiation in the visible section of the electromagnetic spectrum (e.g., having a frequency on the order of approximately $10^{15}$), they face a number of drawbacks. For example, integrated optical waveguides are not able to directly interact with circuitry disposed within a silicon substrate since silicon is not a direct band-gap semiconductor material that generates photons. Furthermore, the bandwidth that can be transmitted by integrated optical waveguides is limited. Because of these drawbacks, data is often transferred on silicon substrates using metal transmission lines rather than integrated optical waveguides. However, at high frequencies metal transmission lines experience a high rate of loss over large distances.

Accordingly, the present disclosure relates to an integrated chip comprising coupling elements configured to couple electromagnetic radiation having a frequency outside of the visible spectrum from a silicon substrate into an integrated dielectric waveguide overlying the silicon substrate. In some embodiments, the integrated chip comprises a dielectric waveguide disposed within an inter-level dielectric (ILD) material overlying a semiconductor substrate. A first coupling element is configured to couple a first electrical signal generated by a driver circuit disposed within the semiconductor substrate to a first end of the dielectric waveguide as electromagnetic radiation having a frequency outside of the visible spectrum. A second coupling element is configured to couple the electromagnetic radiation from a second end of the dielectric waveguide to a second electrical signal. By coupling electromagnetic radiation having a frequency outside of the visible spectrum to and from the dielectric waveguide, the disclosed integrated chip is able to overcome a number of drawbacks of optical integrated waveguides.

Figure 1A:
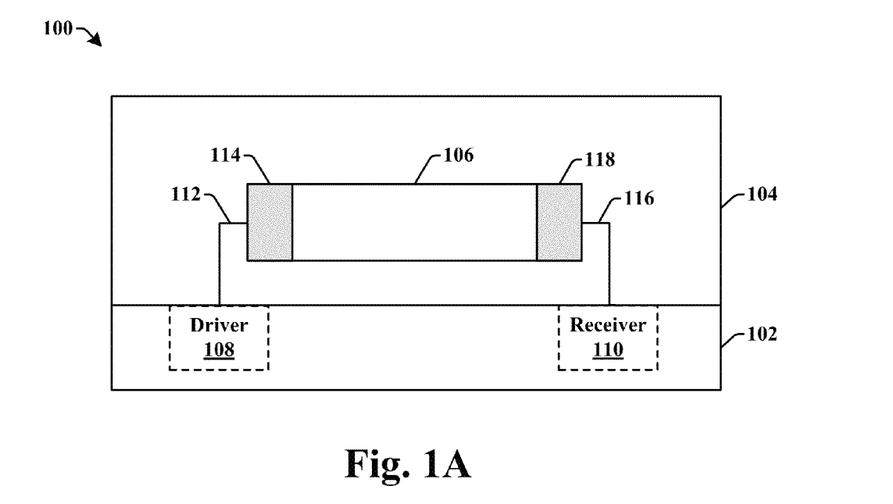
FIGS. 1A-1B illustrate some embodiments of an integrated chip comprising an integrated dielectric waveguide.

FIG. 1A illustrates some embodiments of a block diagram showing a cross-sectional view of an integrated chip 100 comprising an integrated dielectric waveguide.

The integrated chip 100 comprises a semiconductor substrate 102. In various embodiments, the semiconductor substrate 102 may comprise any type of semiconductor body such as a semiconductor wafer or one or more die on a wafer, as well as any other type of semiconductor and/or epitaxial layers formed thereon and/or otherwise associated therewith.

In some embodiments, the semiconductor substrate 102 may comprise an indirect band-gap material, such as silicon.

An inter-level dielectric (ILD) material 104 is disposed over the semiconductor substrate 102. In various embodiments, the ILD material 104 may comprise one or more dielectric layers. For example, the ILD material 104 may comprise one or more of a low-k dielectric layer, an ultra-low k (ULK) dielectric layer, and/or a silicon dioxide ($SiO_2$) layer. A dielectric waveguide 106 is disposed within the ILD material 104. The dielectric waveguide 106 comprises a dielectric material having a dielectric constant (i.e., permittivity) that is larger than that of the surrounding ILD material 104.

A driver circuit 108 and a receiver circuit 110 are disposed within the semiconductor substrate 102. The driver circuit 108 is coupled to a first coupling element 114 by way of a first interconnect 112 (e.g., transmission line). The driver circuit 108 is configured to generate a first electrical signal, which is coupled into the dielectric waveguide 106 as electromagnetic radiation by way of a first coupling element 114. In some embodiments, the first coupling element 114 may comprise a metal coupling element (e.g., a metal transmission line or micro-strip line). In some embodiments, the electromagnetic radiation will have a frequency that is outside of the visible spectrum.

The dielectric waveguide 106 is configured to convey the electromagnetic radiation along a length of the dielectric waveguide 106 to a second coupling element 118. The second coupling element 118 is configured to couple the electromagnetic radiation from the dielectric waveguide 106 as a second electrical signal that is provided to the receiver circuit 110 by way of a second interconnect 116 (e.g., transmission line). In some embodiments, the second coupling element 118 may comprise a metal coupling element (e.g., a metal transmission line or micro-strip line). By using the first and second coupling elements, 114 and 118, to couple signals into and out of the dielectric waveguide 106, integrated chip 100 is able to transmit electromagnetic radiation over a broad range of frequencies, thereby enabling the dielectric waveguide 106 to be used to transfer data signals over substrates comprising direct and indirect band-gap materials.

Figure 1B:
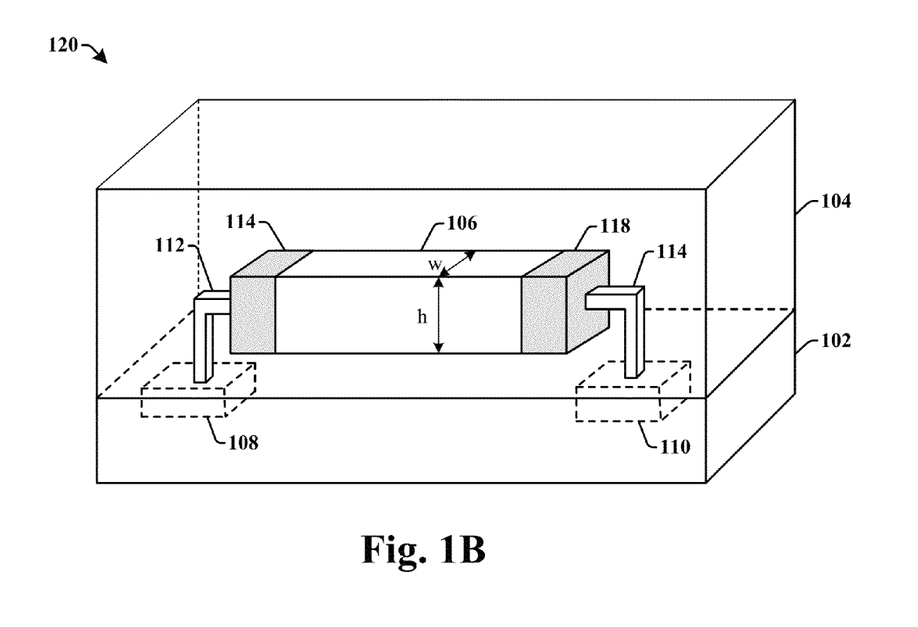

FIG. 1B illustrates some embodiments of a three-dimensional view 120 of an integrated chip comprising an integrated dielectric waveguide.

As shown in three-dimensional view 120, the dielectric waveguide 106 comprises a slab waveguide disposed over the semiconductor substrate 102. In some embodiments, the dielectric waveguide 106 may have a substantially rectangular cross section comprising a height h and a width w. In some embodiments, the height h may be in a range of between approximately 100 nm and approximately 2 um. In some embodiments, the width w may be in range of between approximately 5 to approximately 15 times the height h. In some embodiments, the dielectric waveguide 106 may have sloped sidewalls, which give the dielectric waveguide 106 an inverted trapezoidal cross-section (having a width that increases as the height increases).

In some embodiments, the dielectric waveguide 106 may comprise a dielectric constant (i.e., permittivity) of greater than or equal to approximately 4, while the ILD material 104 may have a dielectric constant of less than 4. The greater dielectric constant of the dielectric waveguide 106 causes electromagnetic radiation introduced into the dielectric waveguide 106 to be confined within the dielectric waveguide 106 by total internal reflection, so that the electromagnetic radiation is guided from the driver circuit 108 to the receiver circuit 110. In some embodiments, the dielectric waveguide 106 may comprise silicon nitride (SiN) or silicon carbide (SiC). In some embodiments, the ILD material 104 may comprise silicon dioxide ($SiO_2$). In other embodiments, the ILD material 104 may comprise a low-k dielectric material, such as fluorine-doped silicon dioxide, carbon-doped silicon dioxide, porous silicon dioxide, or a similar material.

Figure 2:
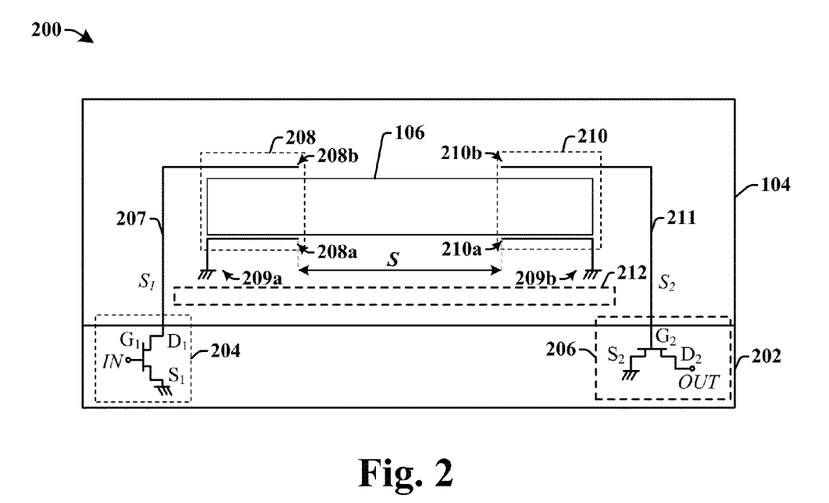
FIG. 2 illustrates some embodiments of a cross-sectional view of an integrated chip comprising an integrated dielectric waveguide.

FIG. 2 illustrates some embodiments of a cross-sectional view of an integrated chip 200 comprising an integrated dielectric waveguide.

The integrated chip 200 comprises a silicon substrate 202 comprising a driver circuit 204 and a receiver circuit 206. The driver circuit 204 comprises a first MOS transistor having a first source region ($S_1$), a first drain region ($D_1$), and a first gate region ($G_1$) coupled to an input signal IN. The receiver circuit 206 comprises a second MOS transistor having a second source region ($S_2$), a second drain region ($D_2$), and a second gate region ($G_2$) coupled to the second coupling element 210.

During operation, the driver circuit 204 is configured to generate a first electrical signal $S_1$ at the first drain region ($D_1$) based upon the input signal IN. Since silicon is not a direct band-gap material, the first electrical signal $S_1$ generated by the driver circuit 202 has a frequency that is not in the visible spectrum (since silicon is an indirect band-gap material, the energy released during electron recombination with a hole is converted primarily into phonons, in contrast to direct band-gap materials that generate photons in the optical spectrum). The first electrical signal $S_1$ causes the first upper electrode 208b to generate an electric field that extends outward from the first upper electrode 208b, through the dielectric waveguide 106, to the first lower electrode 208a. The electric field causes electromagnetic radiation corresponding to the first electrical signal $S_1$ to be coupled into the dielectric waveguide 106.

The coupled electromagnetic radiation is guided by the dielectric waveguide 106 to the second coupling element 210. The second coupling element 210 is configured to couple the electromagnetic radiation from the dielectric waveguide 106 to second electrical signal $S_2$, equivalent to the first electrical signal $S_1$, which is provided to the second gate region ($G_2$) of the receiver circuit 206.

While the first and second electrical signals, $S_1$ and $S_2$, may have a frequency that is lower than that of the visible spectrum, they can provide for a large data transfer rate due to the wide bandwidth of electromagnetic radiation that can be transmitted by the dielectric waveguide 106. For example, the dielectric waveguide 106 may provide for a bandwidth that is more than ten times larger than that of the visible spectrum, resulting in data transfer rates of that can exceed 10 gigabits/s. Such data transfer rates can provide for ultra-high-speed (UHS) interconnect on silicon substrates and/or on packages containing silicon substrates at high frequencies that experience high loss for transmission lines.

In some embodiments, the first coupling element 208 may comprise a first pair of metal structures (e.g., a micro-strips) disposed on opposing sides of the dielectric waveguide 106. For example, the first coupling element 208 may comprise a first lower electrode 208a (e.g., within a first metal interconnect layer) disposed along a bottom surface of the dielectric waveguide 106 and a first upper electrode 208b (e.g., within a second metal interconnect layer) disposed along a top surface of the dielectric waveguide 106. The first lower electrode 208a is connected to a first ground terminal 209a, while the first upper electrode 208b is connected to the driver circuit 204 by way of a first metal transmission line 207. The first metal transmission line 207 provides for a wide bandwidth transmission of signals from the driver circuit 204 to the first upper electrode 208b. In some embodiments, the first upper electrode 208b may be comprised within the first metal transmission line 207.

The second coupling element 210 may comprise a second pair of metal structures disposed on opposing sides of the dielectric waveguide 106. For example, the second coupling element 210 may comprise a second lower electrode 210a (e.g., within the first metal interconnect layer) disposed along the bottom surface of the dielectric waveguide 106 and a second upper electrode 210b (e.g., within the second metal interconnect layer) disposed along the top surface of the dielectric waveguide 106. The second lower electrode 210a is connected to a second ground terminal 209b, while the second upper electrode 210b is connected to the receiver circuit 206 by way of a second metal transmission line 211. The first pair of metal structures is laterally separated from the second pair of metal structures by a space S, so that the lower electrodes, 208a and 210a, and the upper electrodes, 208b and 210b, are non-continuous along a length of the dielectric waveguide 106. In some embodiments, the space S may be on the order of microns to tens of millimeters.

In some embodiments, a grounded shielding element 212 is vertically positioned between the dielectric waveguide 106 and the silicon substrate 202. The grounded shielding element 212 is configured to shield the dielectric waveguide 106 from interference due to signals generated within the silicon substrate 202, and vice versa. By shielding the dielectric waveguide 106 from interference due to signals generated within the silicon substrate 202, noise from the silicon substrate 202 will not be coupled into the dielectric waveguide 106, thereby improving performance of the dielectric waveguide 106.

Figure 3:
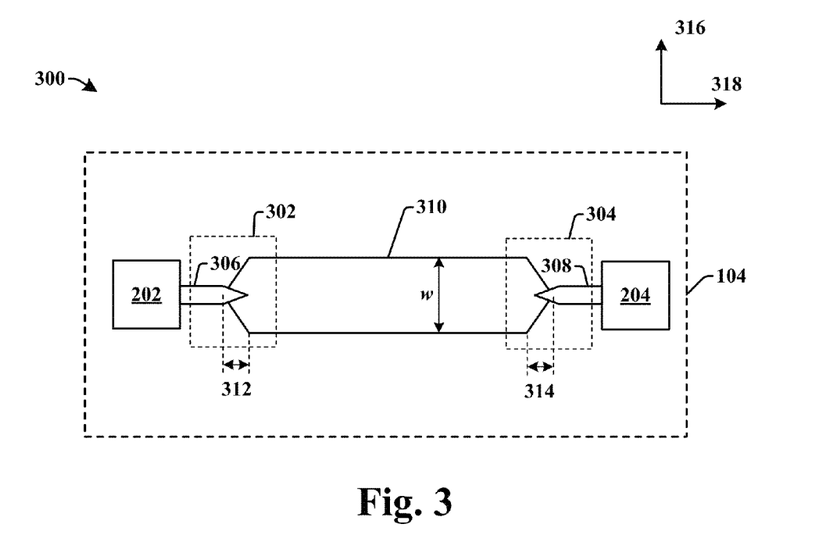
FIG. 3 illustrates some embodiments of a top-view of an integrated chip comprising an integrated dielectric waveguide having one or more tapered transitional regions.

FIG. 3 illustrates some embodiments of a top-view of an integrated chip 300 comprising an integrated dielectric waveguide having one or more tapered transitional regions, 312 and/or 314.

Integrated chip 300 comprises a first coupling element 302 and a second coupling element 304, respectively comprising micro-strip lines, 306 and 308, disposed over a dielectric waveguide 310. The micro-strip lines, 306 and 308, are configured to couple energy into and out of the dielectric waveguide 310, as described above.

In some embodiments, the dielectric waveguide 310 may comprise one or more tapered ends having widths w (along direction 316) that gradually decrease (e.g., from a first width to a second narrower width) over a length (along direction 318) of a transition region. For example, dielectric waveguide 310 comprises a first tapered end, having a width that decreases over a first transition region 312, and a second tapered end having a width that decreases over a second transition region 314.

The tapered ends of the dielectric waveguide 106 are configured to increase efficiency by which electromagnetic radiation is coupled between the micro-strip lines, 306 and/or 308, and the dielectric waveguide 310 by reducing the reflection of radiation between the micro-strip lines, 306 and/or 308, and the dielectric waveguide 310. For example, the tapered transitional region changes the angle at which electromagnetic radiation interacts with sidewalls of the dielectric waveguide 106, thereby increase the coupling of electromagnetic radiation between the micro-strip lines, 306 and/or 308, and the dielectric waveguide 310 (since total internal reflection is a function of an angle at which electromagnetic radiation is incident upon a surface).

In some embodiments, the micro-strip lines, 306 and 308, can also or alternatively have tapered widths, to further increase coupling efficiency between the first and second coupling elements, 302 and 304, and the dielectric waveguide 310. In such embodiments, the micro-strip lines, 306 and 308, have widths that decrease (e.g., from a first width to a second narrower width) over the transition regions, 312 and 314. In some embodiments, the tapered widths of the micro-strip lines, 306 and 308, may be different in length (i.e., have different sized transitional regions) than the tapered widths of a dielectric waveguide 106.

Figure 4:
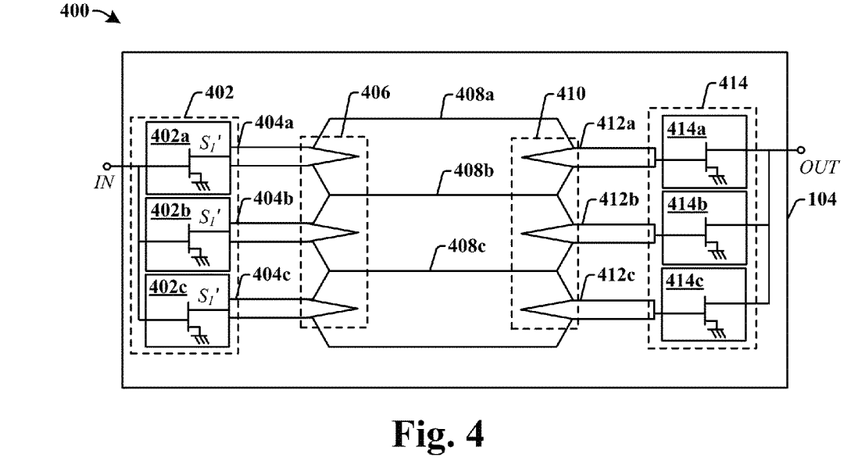
FIG. 4 illustrates some embodiments of a top-view of an integrated chip comprising a plurality of integrated dielectric waveguides configured to convey electromagnetic radiation in parallel.

FIG. 4 illustrates some embodiments of a top-view of an integrated chip 400 comprising a plurality of an integrated dielectric waveguides configured to convey electromagnetic radiation in parallel.

Integrated chip 400 comprises a plurality of dielectric waveguides 408a-408c disposed between a driver circuit 402 and a receiver circuit 414. In some embodiments, the plurality of dielectric waveguides 408a-408c may be physically arranged in parallel to one another. In some embodiments, the plurality of dielectric waveguides 408a-408c may abut one another. In other embodiments, the plurality of dielectric waveguides 408a-408c may be spatially separated from one another.

The driver circuit 402 comprises a plurality of separate driver elements, 402a-402c, which are configured to respectively generate a first electrical signal $S_1'$. The first electrical signal $S_1'$ is provided in parallel to micro-strip lines 404a-404c, which couple the first electrical signal $S_1'$ as electromagnetic radiation into the plurality of dielectric waveguides 408a-408c, which convey the signal in parallel. Since the first electrical signal $S_1'$ is transmitted in parallel, smaller amplitude signals can be conveyed by each of the plurality of dielectric waveguides 408a-408c, thereby further decreasing loss between the micro-strips 404a-404c and the plurality of dielectric waveguides 408a-408c (e.g., since the smaller amplitude signals $S_1'$ output by the plurality of driver elements, 402a-402c, will experience less loss when reflected).

Figure 5A:
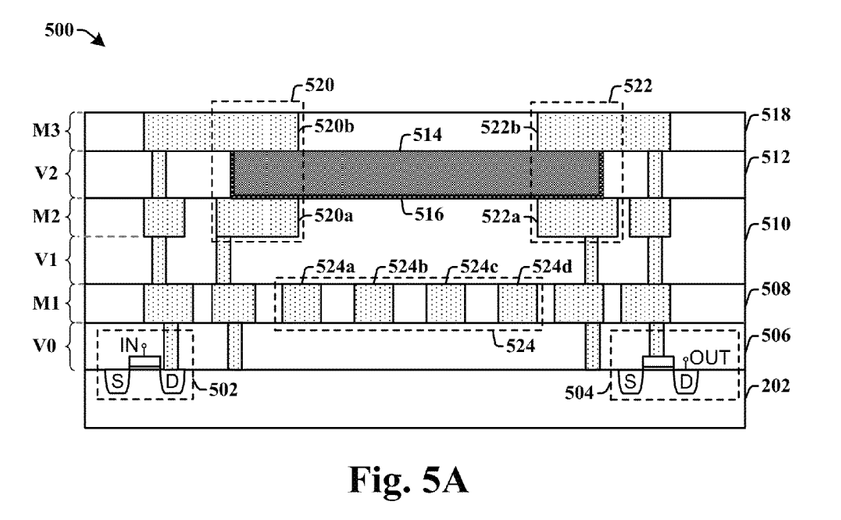
FIGS. 5A-5B illustrates some embodiments of integrated chips comprising an integrated dielectric waveguide disposed within a back-end-of-the-line (BEOL) metallization stack.

FIG. 5A illustrates some embodiments of a cross-sectional view of an integrated chip 500 comprising an integrated dielectric waveguide disposed within a back-end-of-the-line (BEOL) metallization stack.

The integrated chip 500 comprises a driver circuit 502 and a receiver circuit 504 disposed within a silicon substrate 202. The driver circuit 502 comprises a first MOS transistor having a first source region (S) separated from a first drain region (D) by a first channel region. A first gate region overlies the first channel region. The receiver circuit 504 comprises a second MOS transistor having a second source region (S) separated from a second drain region (D) by a second channel region. A second gate region overlies the second channel region.

The BEOL metallization stack comprises a plurality of metal interconnect layers disposed within an ILD material overlying the silicon substrate 202. In some embodiments, the BEOL metallization stack may alternate between metal wire layers M1-M3 (configured to provide for lateral connections) and via layers V0-V2 (configured to provide for vertical connections). In some embodiments, a first via layer V0 may comprise tungsten (W), while the remaining metal interconnect layers, V1-V2 and M1-M3, may comprise copper (Cu) and/or aluminum (Al)

A first coupling element 520 comprises a first lower electrode 520a disposed within a second metal wire layer M2 and a first upper electrode 520b disposed within a third metal wire layer M3. The first lower electrode 520a is grounded, while the first upper electrode 520b is coupled to the first drain region of the first MOS transistor by way of a plurality of metal interconnect layers (V2, M2, V1, M1, and V0). The second coupling element 522 comprises a second lower electrode 522a disposed within the second metal wire layer M2 and a second upper electrode 522b disposed on the third metal wire layer M3. The second lower electrode 522a is grounded, while the second upper electrode 410b is coupled to the second gate region of the second MOS transistor by way of a plurality of metal interconnect layers (V2, M2, V1, M1, and V0). In some embodiments, the dielectric waveguide 514 comprises a dielectric material disposed within a second via layer V2 vertically disposed between the second metal wire layer M2 and the third metal wire layer M3

In some embodiments, a shielding element 524 is vertically arranged between the dielectric waveguide 514 and the silicon substrate 202. The shielding element 524 comprises a plurality of grounded metal wires 524a-524d arranged in parallel. In some embodiments, the plurality of grounded metal wires 524a-524d are disposed on a first metal wire layer M1.

Although FIG. 5A illustrates the dielectric waveguide 514 as being on a second via layer V1 vertically disposed between first and second coupling elements, 520 and 522, located on the second and third metal wire layers, M2 and M3, it will be appreciated that the disclosed dielectric waveguide 514 is not limited to such positions within the BEOL metallization stack. Rather, the dielectric waveguide 514 and the first and second coupling elements, 520 and 522, may be disposed at different positions within the BEOL metallization stack.

Figure 5B:
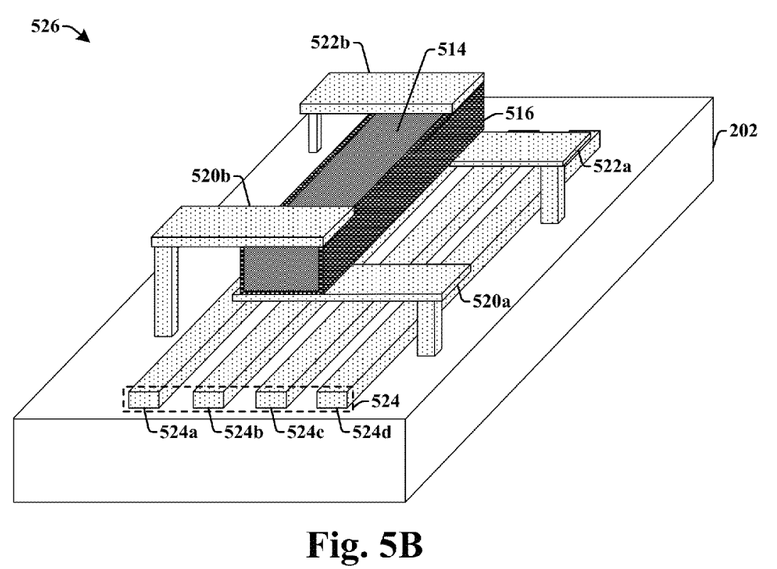

FIG. 5B illustrates a three-dimensional view of some alternative embodiments of an integrated chip 526 comprising an integrated dielectric waveguide disposed within a BEOL metallization stack. Integrated chip 526 comprises lower electrodes, 520a and 522a, and upper electrodes, 520b and 522b, which extend to positions below and above the dielectric waveguide 514 from opposite sides.

Figure 6:
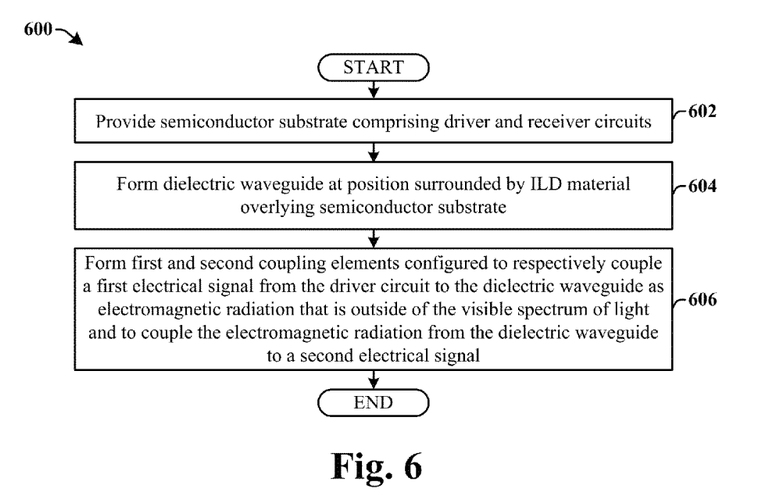
FIG. 6 illustrates a flow diagram of some embodiments of a method of forming an integrated chip comprising an integrated dielectric waveguide.

FIG. 6 illustrates a flow diagram of some embodiments of a method 600 of forming an integrated chip comprising an integrated dielectric waveguide.

While disclosed methods (e.g., methods 600 and 700) are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 602, a semiconductor substrate is provided comprising a driver circuit and a receiver circuit. In some embodiments, the semiconductor substrate may comprise an indirect bandgap semiconductor material, such as silicon.

At 604, a dielectric waveguide is formed at a position surrounded by an (inter-level dielectric) ILD material overlying the semiconductor substrate.

At 606, first and second coupling elements are formed on opposing ends of the dielectric waveguide. The first and second coupling elements comprise metal structures disposed on opposing sides of the dielectric waveguide, which are configured to respectively couple a first electrical signal from the driver circuit to the dielectric waveguide as electromagnetic radiation that is outside of the visible spectrum of light and to couple electromagnetic radiation from the dielectric waveguide to a second electrical signal that is provided to the receiver circuit.

Figure 7:
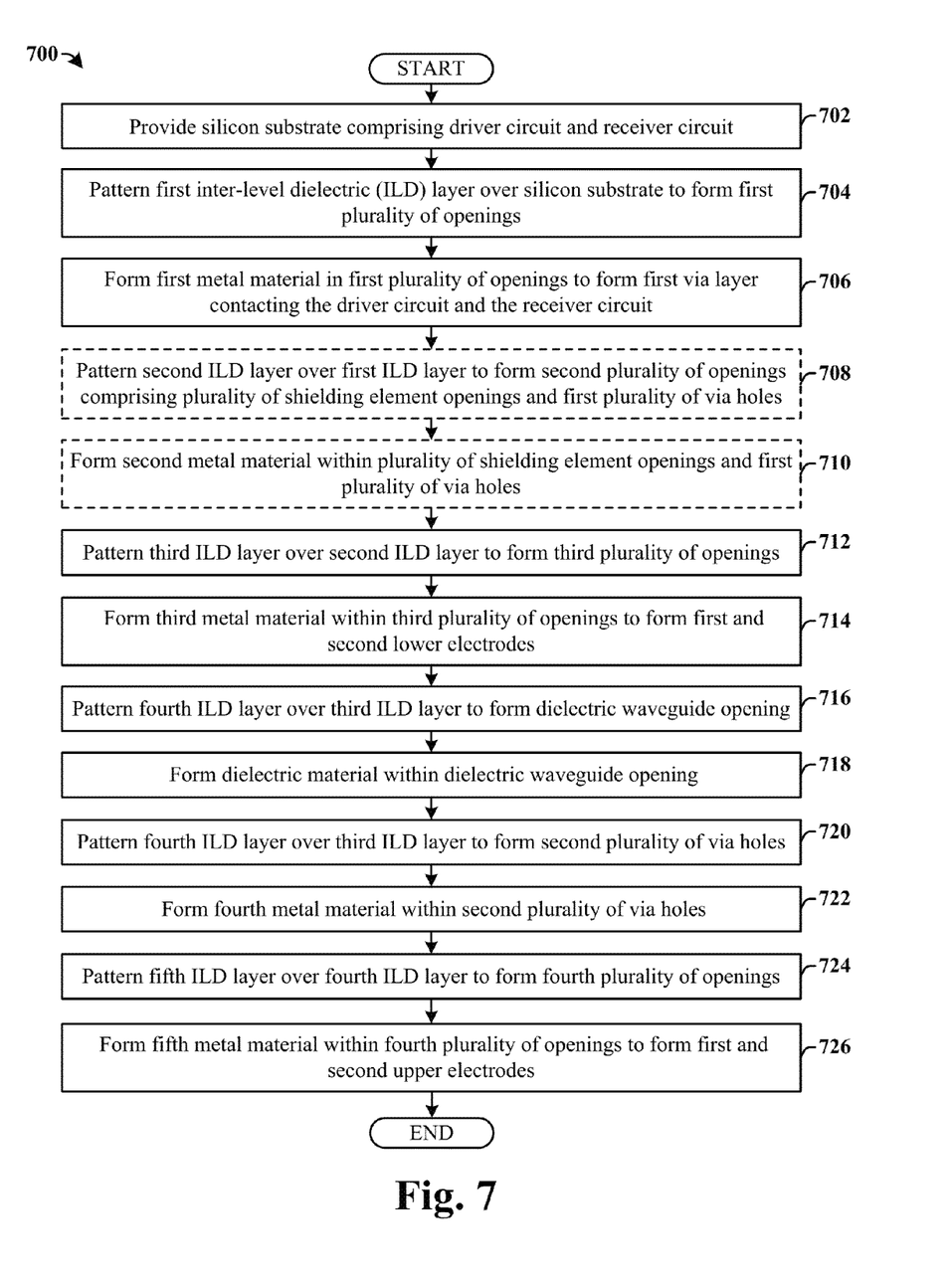
FIG. 7 illustrates a flow diagram of some embodiments of a method of forming an integrated chip comprising an integrated dielectric waveguide disposed within a BEOL metallization stack.

FIG. 7 illustrates a flow diagram of some embodiments of a method 700 of forming an integrated chip comprising an integrated dielectric waveguide disposed within a back-end-of-the line (BEOL) metallization stack.

At 702, a silicon substrate comprising a driver circuit and a receiver circuit is provided. In some embodiments, the driver circuit and the receiver circuit comprise MOS transistors disposed within the silicon substrate.

At 704, a first (inter-level dielectric) ILD layer overlying the silicon substrate is patterned to form a first plurality of openings.

At 706, a first metal material is formed within the first plurality of openings to form a first via layer contacting the driver and receiver circuits.

At 708, a second ILD layer overlying the first ILD layer is patterned to form a second plurality of openings comprising a plurality of shielding element openings and a first plurality of via holes.

At 710, a second metal material is formed within the plurality of shielding element openings and the first plurality of via holes. Forming the second metal material within the plurality of shielding element openings forms a shielding element comprising a plurality of grounded metal wires within the second ILD layer, which are arranged in parallel.

At 712, a third ILD layer overlying the second ILD layer is patterned to form a third plurality of openings. The third plurality of openings comprise a first lower electrode opening and a second lower electrode opening. The first and second lower electrode openings are laterally separated from one another.

At 714, a third metal material is formed within the first and second lower electrode openings to form first and second lower electrodes within the third ILD layer.

At 716, a fourth ILD layer overlying the third ILD layer is patterned to form a dielectric waveguide opening. The dielectric waveguide opening has a first end that exposes the first lower electrode and a second end that exposes the second lower electrode.

At 718, a dielectric material is formed within the dielectric waveguide opening to form a dielectric waveguide within the fourth ILD layer. The dielectric material has a greater dielectric constant than that of surrounding ILD layers.

At 720, the fourth ILD layer is patterned to form a second plurality of via holes within the fourth ILD layer.

At 722, a fourth metal material is formed within the second plurality of via holes.

At 724, a fifth ILD layer overlying the fourth ILD layer is patterned to form a first upper electrode opening and a second upper electrode opening. The first upper electrode opening and the second upper electrode opening are laterally separated from one another, and expose opposing ends of the dielectric waveguide.

At 726, a fifth metal material is formed within the first and second upper electrode openings to form first and second upper electrodes within the fifth ILD layer.

FIGS. 8-13 illustrate some embodiments of cross-sectional views showing a method of forming an integrated chip comprising an integrated dielectric waveguide. Although FIGS. 8-13 are described in relation to method 700, it will be appreciated that the structures disclosed in FIGS. 8-13 are not limited to such a method, but instead may stand alone as structures independent of the method.

Figure 8:
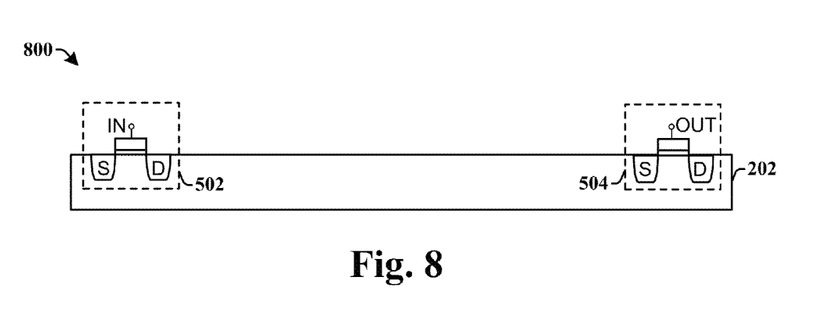
FIGS. 8-13 illustrate some embodiments of cross-sectional views showing a method of forming an integrated chip comprising an integrated dielectric waveguide.

FIG. 8 illustrates some embodiments of a cross-sectional view 800 of an integrated chip corresponding to act 702.

As shown in cross-sectional view 800, a silicon substrate 202 is provided. The silicon substrate 202 comprises a driver circuit 502 and a receiver circuit 504. In some embodiments, the driver circuit 502 and the receiver circuit 504 comprise MOS transistors disposed within the silicon substrate 202.

Figure 9:
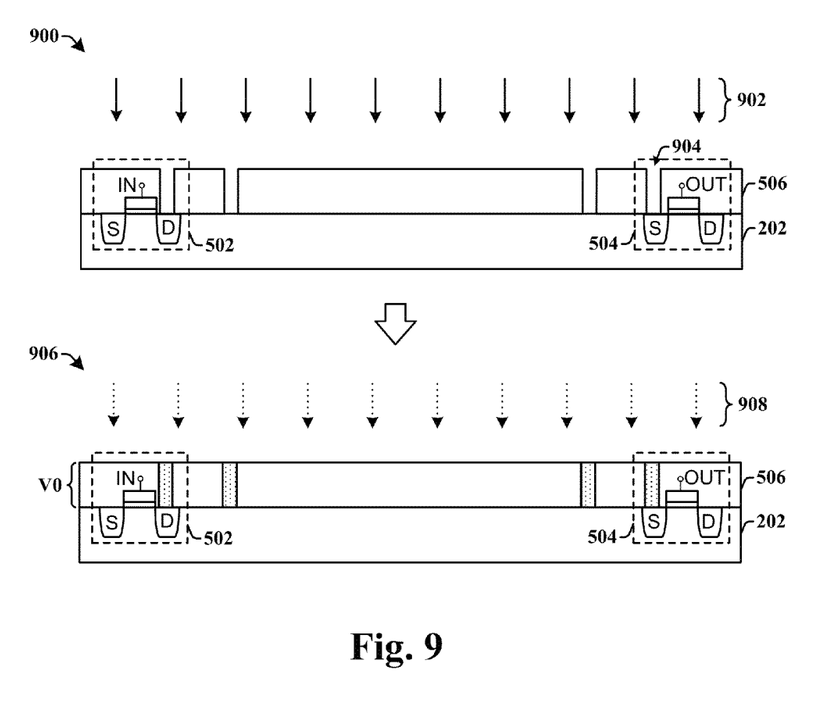

FIG. 9 illustrates cross-sectional views, 900 and 906, of an integrated chip corresponding to acts 704-706.

As shown in cross-sectional view 900, a first ILD layer 506 is formed over the silicon substrate 202. The first ILD layer 506 may comprise a low-k dielectric layer deposited by way of a vapor deposition technique (e.g., physical vapor deposition, chemical vapor deposition, etc.). In some embodiments, the first ILD layer 506 may have a dielectric constant that is less than 3.9.

The first ILD layer 506 is selectively exposed to a first etchant 902. The first etchant 902 is configured to selectively etch the first ILD layer 506 to form a first plurality of openings 904 extending through the first ILD layer 506. The first plurality of openings 904 expose a drain of the driver circuit 502 and the receiver circuit 504. In some embodiments, the first etchant 902 may comprise a dry etchant have an etching chemistry comprising a fluorine species (e.g., $CF_4$, $CHF_3$, $C_4F_8$, etc.). In some embodiments, the etching chemistry may further comprise oxygen or hydrogen, for example. In other embodiments, the first etchant 902 may comprise a wet etchant comprising hydroflouric acid (HF).

As shown in cross-sectional view 906, a first metal material 908 is formed within the first plurality of openings 904. In some embodiments, the first metal material 908 may be formed by way of a vapor deposition technique. In some embodiments, the first metal material 908 may comprise tungsten (W). In some embodiments, a diffusion barrier layer (not shown) may be deposited into the first plurality of openings 904 prior to forming the first metal material 908. In various embodiments, the diffusion barrier layer may comprise titanium nitride (TiN), tantalum nitride (TaN), hafnium nitride (HfN), etc.

Figure 10:
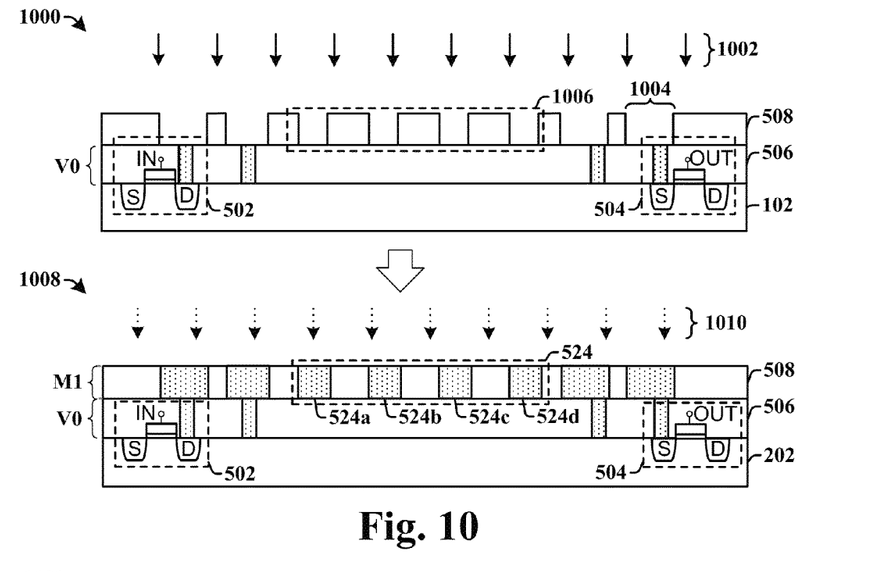

FIG. 10 illustrates cross-sectional views, 1000 and 1008, of an integrated chip corresponding to acts 708-710.

As shown in cross-sectional view 1000, a second ILD layer 508 (e.g., a low-k dielectric layer) is formed over the first ILD layer 506 (e.g., by way of a vapor deposition technique). The second ILD layer 508 is selectively exposed to a second etchant 1002 (e.g., $CF_4$, $CHF_3$, $C_4F_8$, HF, etc.) configured to selectively etch the second ILD layer 508 to form a second plurality of openings comprising a first plurality of via openings 1004 and a plurality of shielding element openings 1006 laterally disposed from the plurality of via openings 1004. The plurality of shielding element openings 1006 comprise metal trenches extending in parallel to one another.

As shown in cross-sectional view 1008, a second metal material 1010 is formed in the first plurality of via openings 1004 and the plurality of shielding element openings 1006. In some embodiments, a deposition process may be used to form a seed layer within the first plurality of via openings 1004 and the plurality of shielding element openings 1006. A subsequent plating process (e.g., an electroplating process, an electro-less plating process) may be used to form the second metal material to a thickness that fills the first plurality of via openings 1004 and the plurality of shielding element openings 1006. In some embodiments, the second metal material 1010 may comprise copper (Cu). A chemical mechanical polishing (CMP) process may be used to remove excess of the second metal material 1010 from a top surface of the second ILD layer 508.

Figure 11:
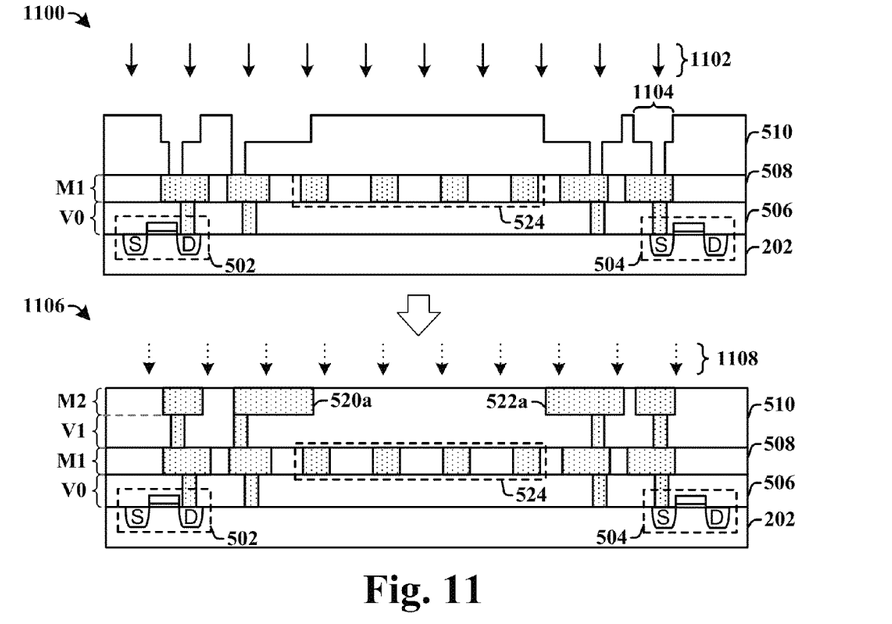

FIG. 11 illustrates cross-sectional views, 1100 and 1102, of an integrated chip corresponding to acts 712-714.

As shown in cross-sectional view 1100, a third ILD layer 510 is formed onto the second ILD layer 508. The third ILD layer 510 is selectively exposed to a third etchant 1102 (e.g., $CF_4$, $CHF_3$, $C_4F_8$, HF, etc.) configured to etch the third ILD layer 510 to from a third plurality of openings 1104. In some embodiments, the third plurality of openings 1104 comprise a via hole, and an overlying metal line trench. The via holes vertically extending from a bottom surface of the third ILD layer 510 to a bottom surface of the metal trenches, which extend to a top surface of the third ILD layer 510.

As shown in cross-sectional view 1106, a third metal material 1108 is formed in the third plurality of openings 1104 to form a second via layer V1 and an overlying second metal wire layer M2. The second metal wire layer M2 comprises a first lower electrode 520a and a second lower electrode 522a. The first lower electrode 520a is laterally separated from the second lower electrode 522a by way of the third ILD layer 510. In some embodiments, the third metal material 1108 (e.g., copper) may be deposited by way of a deposition process, a subsequent plating process, and a CMP process, as described above.

Although FIG. 11 illustrates the formation of the second via layer V1 and second metal wire layer M2 using a dual damascene process, one of ordinary skill in the art will appreciate that the in alternative embodiments, the second via layer V1 and the second metal wire layer M2 may be formed using a single damascene process. In such embodiments, a first dielectric layer is selectively etched to form via holes, which are subsequently filled. A second dielectric layer is then formed over the first dielectric layer. The second dielectric layer is selectively etched to form metal trenches.

Figure 12:
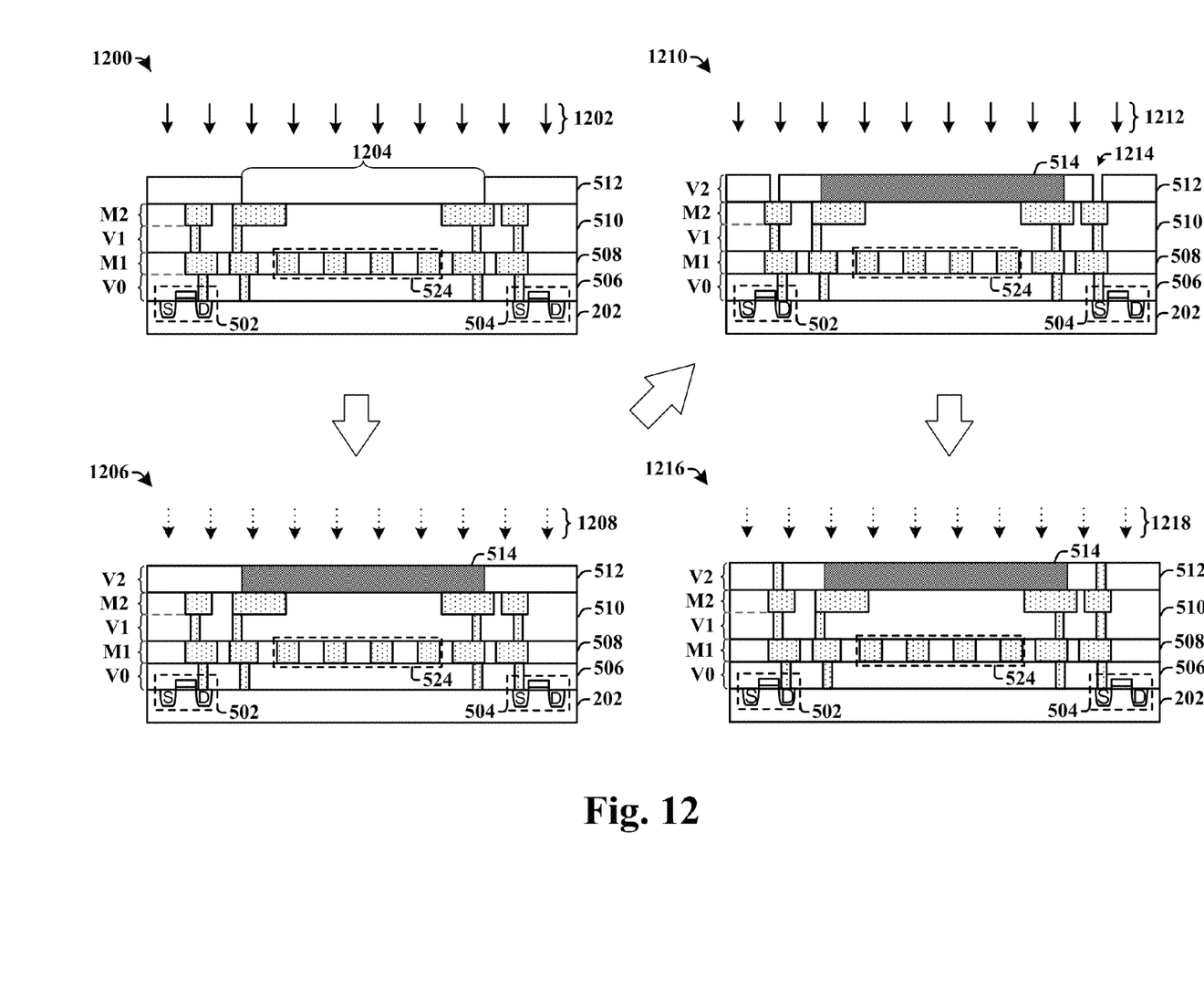

FIG. 12 illustrates some embodiments of cross-sectional views, 1200 and 1202, of an integrated chip corresponding to acts 716-722.

As shown in cross-sectional view 1200, a fourth ILD layer 512 is formed over the third ILD layer 510. The fourth ILD layer 512 is selectively exposed to a fourth etchant 1202 (e.g., $CF_4$, $CHF_3$, $C_4F_8$, HF, etc.) configured to etch the fourth ILD layer 512 to form a dielectric waveguide opening 1204. The dielectric waveguide opening 1204 comprises an oblong opening that laterally extends from a first position overlying the first lower electrode 520a to a second position overlying the second lower electrode 522a.

As shown in cross-sectional view 1206, a dielectric material 1208 is formed within the dielectric waveguide opening 1204. The dielectric material 1208 comprises a higher dielectric constant than the surrounding ILD layers (e.g., ILD layer 510 and 512). In some embodiments, the dielectric material 1208 may be formed by way of a vapor deposition technique (e.g., PVD, CVD, PE-CVD, etc.) to a thickness that fills the dielectric waveguide opening 1204. A chemical mechanical polishing (CMP) process may be used to remove excess of the dielectric material 1208 from a top surface of the fourth ILD layer 512.

As shown in cross-sectional view 1210, the fourth ILD layer 512 is selectively exposed to a fifth etchant 1212 (e.g., $CF_4$, $CHF_3$, $C_4F_8$, HF, etc.) configured to etch the fourth ILD layer 512 to from a second plurality of via holes 1214. The second plurality of via holes 1214 comprise substantially round via openings disposed over an underlying metal layer (i.e., the via holes 1214 are predominately over the underlying second metal layer M2 so as to provide for contact between a subsequently formed via and the underlying second metal layer M2). The second plurality of via holes 1214 are laterally separated from the dielectric waveguide opening 1204 (i.e., the dielectric waveguide opening 1204 is disposed on a same vertical level as the second plurality of via holes 1214).

As shown in cross-sectional view 1216, a fourth metal material 1218 is formed within the second plurality of via holes 1214. In some embodiments, the fourth metal material 1218 (e.g., copper) may be deposited by way of a deposition process, a subsequent plating process, and a CMP process, as described above.

Figure 13:
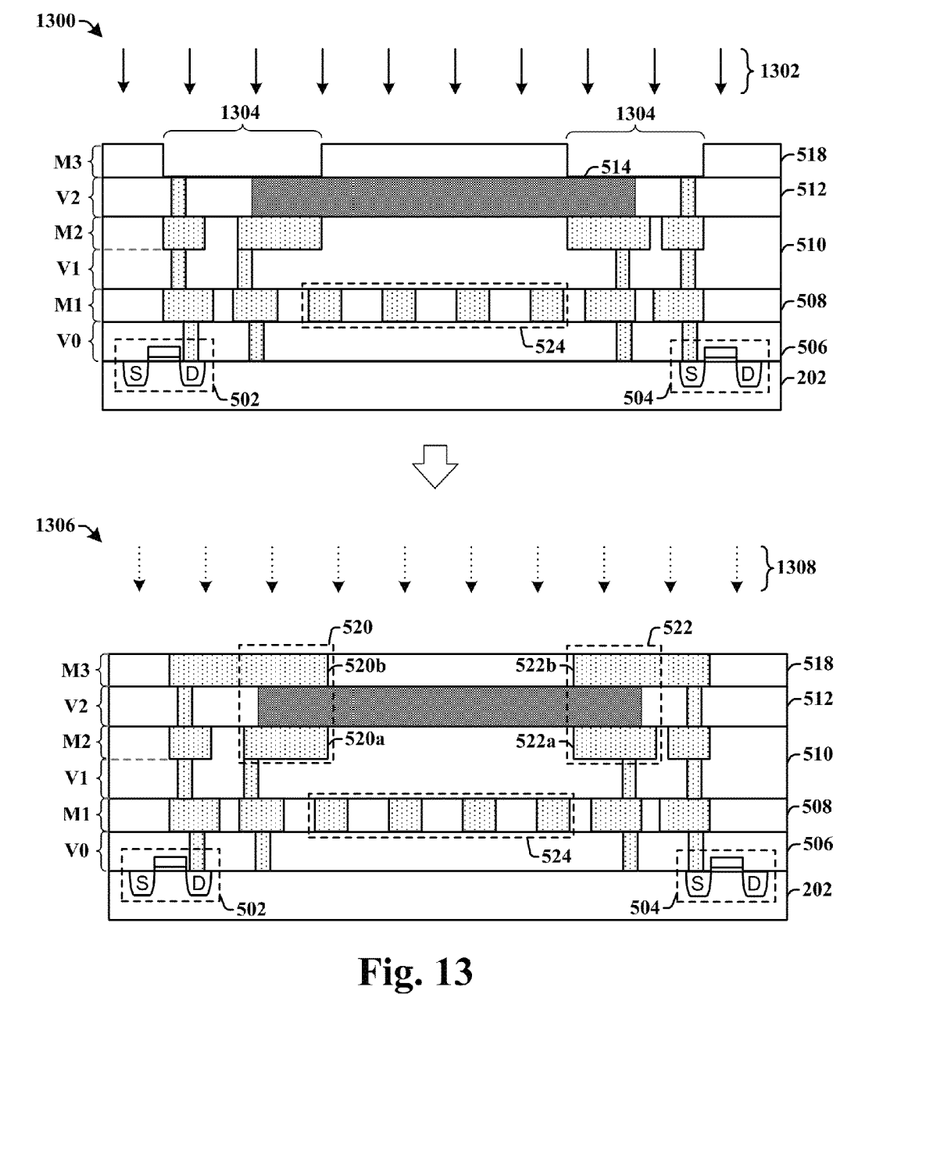

FIG. 13 illustrates some embodiments of cross-sectional views, 1300 and 1306, of an integrated chip corresponding to acts 724-726.

As shown in cross-sectional view 1300, a fifth ILD layer 518 is formed over the fourth ILD layer 512. The fifth ILD layer 518 is selectively exposed to a sixth etchant 1302 (e.g., $CF_4$, $CHF_3$, $C_4F_8$, HF, etc.) configured to etch the fifth ILD layer 518 to from a fourth plurality of openings 1304 comprising metal trenches that extend through the fifth ILD layer 518.

As shown in cross-sectional view 1306, a fifth metal material 1308 is formed in the fourth plurality of openings 1304. In some embodiments, the fifth metal material 1308 (e.g., copper) may be deposited by way of a deposition process, a subsequent plating process, and a CMP process, as described above. The fifth metal material 1308 forms a first upper electrode 520*b* and a second upper electrode 522*b* within a third metal wire layer M3. The first upper electrode 520*b* is laterally separated from the second upper electrode 522*b* by way of the fifth ILD layer 518.

Therefore, the present disclosure relates to an integrated chip comprising coupling elements configured to couple electromagnetic radiation having a frequency outside of the visible spectrum from a silicon substrate into an integrated dielectric waveguide overlying the silicon substrate.

In some embodiments, the present disclosure relates to an integrated chip. The integrated chip comprises an inter-level dielectric (ILD) material disposed over a semiconductor substrate. A dielectric waveguide is disposed within the ILD material and has a permittivity higher than the ILD material. A first coupling element is configured to couple a first electrical signal generated by a driver circuit disposed within the semiconductor substrate to a first end of the dielectric waveguide as electromagnetic radiation having a frequency that is outside of the visible spectrum of light. A second coupling element is configured to couple the electromagnetic radiation from a second end of the dielectric waveguide to a second electrical signal.

In other embodiments, the present disclosure relates to an integrated chip. The integrated chip comprises an inter-level dielectric (ILD) material disposed over a silicon substrate. A dielectric waveguide having a rectangular cross-sectional is disposed within the ILD material and having a permittivity higher than the ILD material. The integrated chip further comprises a first metal interconnect layer disposed along a first side of the dielectric waveguide and a second metal interconnect layer disposed along a second side of the dielectric waveguide. The first metal interconnect layer has a first lower electrode coupled to a first ground terminal and a spatially separated second lower electrode coupled to a second ground terminal. The second metal interconnect layer has a first upper electrode coupled to a driver circuit disposed within the silicon substrate and a spatially separated second upper electrode section coupled to a receiver circuit disposed within the silicon substrate.

In yet other embodiments, the present disclosure relates to a method of forming an integrated dielectric waveguide. The method comprises providing a silicon substrate comprising a driver circuit and a receiver circuit. The method further comprises forming a dielectric waveguide within an inter-level dielectric (ILD) material overlying the semiconductor substrate. The method further comprises forming a first coupling element and a second coupling element configured to respectively couple signals from the driver circuit to the dielectric waveguide as electromagnetic radiation that is outside of the visible spectrum of light and to couple the electromagnetic radiation from the dielectric waveguide to the receiver circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated chip, comprising:
    an inter-level dielectric (ILD) material disposed over a semiconductor substrate;
    a dielectric waveguide disposed within the ILD material and having a permittivity higher than the ILD material;
    a first coupling element configured to couple a first electrical signal generated by a driver circuit disposed within the semiconductor substrate to a first end of the dielectric waveguide as electromagnetic radiation having a frequency that is outside of the visible spectrum of light; and
    a second coupling element configured to couple the electromagnetic radiation from a second end of the dielectric waveguide to a second electrical signal.

2. The integrated chip of claim 1, wherein the first coupling element comprises:
    a first upper electrode comprising a first metal structure disposed over the dielectric waveguide and coupled to the driver circuit by way of a first transmission line; and
    a first lower electrode comprising a second metal structure disposed below the dielectric waveguide and coupled to a ground terminal.

3. The integrated chip of claim 1, wherein the first coupling element comprises a first upper electrode arranged over the dielectric waveguide and the second coupling element comprises a second upper electrode arranged over the dielectric waveguide and spatially separated from the first upper electrode.

4. The integrated chip of claim 1, wherein
    the first coupling element comprises a first metal structure disposed over the dielectric waveguide and coupled to the driver circuit by way of a first transmission line;
    the first metal structure straddles an end of the dielectric waveguide and has a tapered portion with a width that is tapered from a first width overlying the end to a second width overlying the dielectric waveguide that is narrower than the first width; and
    a width of the dielectric waveguide underlying the tapered portion of the first metal structure is tapered in an opposite direction as the tapered portion.

5. The integrated chip of claim 1, further comprising:
    one or more additional dielectric waveguides laterally disposed adjacent to the dielectric waveguide; and
    one or more additional coupling elements configured to couple the first electrical signal into the one or more additional dielectric waveguides.

6. The integrated chip of claim 1, wherein the semiconductor substrate comprises a silicon substrate.

7. The integrated chip of claim 1, wherein the dielectric waveguide comprises silicon nitride (SiN) or silicon carbide (SiC).

8. The integrated chip of claim 1, wherein the dielectric waveguide has a rectangular cross-section.

9. The integrated chip of claim 1, further comprising:
a shielding element having a plurality of grounded metal wires arranged substantially in parallel to one another and to an upper surface of the semiconductor substrate and vertically disposed between the dielectric waveguide and the semiconductor substrate.

10. An integrated chip, comprising:
an inter-level dielectric (ILD) material disposed over a silicon substrate;
a dielectric waveguide having a rectangular cross-sectional disposed within the ILD material;
a first metal interconnect layer disposed along a bottom of the dielectric waveguide, wherein the first metal interconnect layer has a first lower electrode coupled to a first ground terminal and a second lower electrode spatially separated from the first lower electrode and coupled to a second ground terminal; and
a second metal interconnect layer disposed along a top of the dielectric waveguide, wherein the second metal interconnect layer has a first upper electrode coupled to a driver circuit disposed within the silicon substrate and a second upper electrode spatially separated from the first upper electrode and coupled to a receiver circuit disposed within the silicon substrate.

11. The integrated chip of claim 10, wherein the first metal interconnect layer and the second metal interconnect layer comprise copper.

12. The integrated chip of claim 10, wherein the first lower electrode straddles an end of the dielectric waveguide and has a tapered portion with a width that is tapered from a first width overlying the end to a second width overlying the dielectric waveguide that is narrower than the first width.

13. The integrated chip of claim 12, wherein a width of the dielectric waveguide underlying the tapered portion of the first lower electrode is tapered in an opposite direction as the tapered portion.

14. The integrated chip of claim 10, further comprising:
one or more additional dielectric waveguides laterally disposed adjacent to the dielectric waveguide; and
one or more additional upper electrodes disposed over the one or more additional dielectric waveguides, wherein the driver circuit is coupled to the one or more additional upper electrodes.

15. The integrated chip of claim 10, wherein the dielectric waveguide comprises silicon nitride (SiN) or silicon carbide (SiC).

16. The integrated chip of claim 10, further comprising:
a shielding element having a plurality of grounded metal wires arranged substantially in parallel to one another and to an upper surface of the silicon substrate and vertically disposed between the dielectric waveguide and the silicon substrate.

17. A method of forming an integrated dielectric waveguide, comprising:
providing a semiconductor substrate comprising a driver circuit and a receiver circuit;
patterning a first ILD layer overlying the semiconductor substrate to form a first plurality of openings;
forming a first metal material within the first plurality of openings to form a first coupling element comprising first and second lower electrodes;
forming a dielectric waveguide overlying the first and second lower electrodes, by patterning a second ILD layer overlying the first ILD layer to form a dielectric waveguide opening, and forming a dielectric material within the dielectric waveguide opening to form the dielectric waveguide;
patterning a third ILD layer overlying the second ILD layer to form a second plurality of openings; and
forming a second metal material within the second plurality of openings to form a second coupling element comprising first and second upper electrodes overlying the dielectric waveguide.

18. The method of claim 17, wherein the dielectric material has a higher permittivity than the second ILD layer.

19. The method of claim 17,
wherein the first coupling element and the second coupling element configured to respectively couple a first electrical signal from the driver circuit to the dielectric waveguide as electromagnetic radiation that is outside of the visible spectrum of light and to couple the electromagnetic radiation from the dielectric waveguide to a second electrical signal that is provided to the receiver circuit.

20. The method of claim 17, further comprising:
patterning a lower ILD layer, vertically located between the third ILD layer and the semiconductor substrate, to form a plurality of shielding element openings and a first plurality of via holes; and
forming a metal material within the plurality of shielding element openings and the first plurality of via holes.

* * * * *